July 26, 1938.  E. D. TILLYER  2,125,056
OPHTHALMIC LENS
Filed Dec. 7, 1935
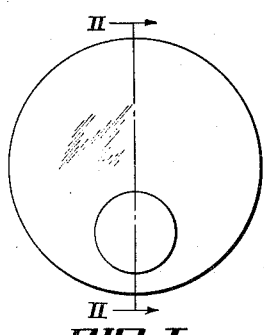
FIG. I
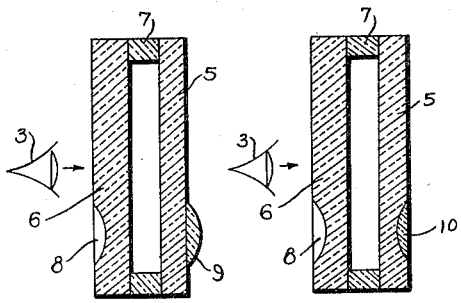
FIG. II  FIG. III
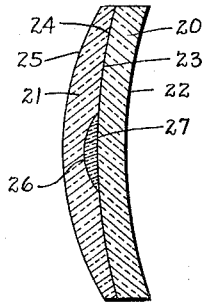
FIG. VI
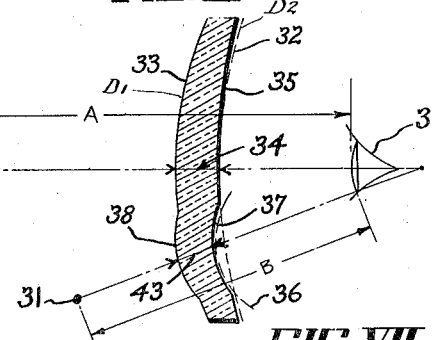
FIG. IV  FIG. V
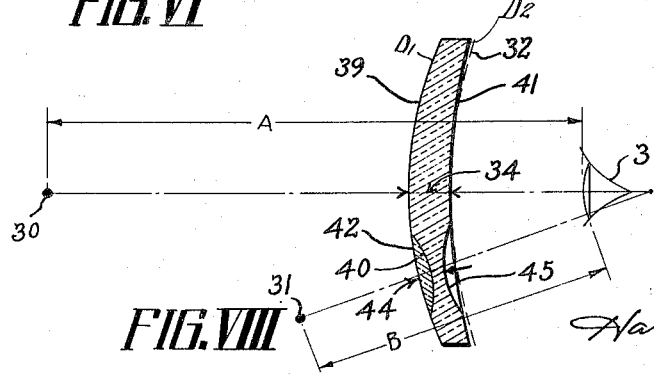
FIG. VII
FIG. VIII
INVENTOR
EDGAR D. TILLYER
BY
Harry H. Styll
ATTORNEY Patented July 26, 1938

2,125,056

UNITED STATES PATENT OFFICE 2,125,056

OPHTHALMIC LENS

Edgar D. Tillyer, Southbridge, Mass., assignor to American Optical Company, Southbridge, Mass., a voluntary association of Massachusetts Application December 7, 1935, Serial No. 53,351

3 Claims. (Cl. 88—54)

This invention relates to improvements in bifocal or multifocal lenses and to an improved process of making the same and relates more particularly to bifocal or multifocal lenses used for the equalization of the mental impressions of size in the two eyes throughout the corresponding focal fields of the lenses without materially changing the required focal powers of said fields, said impressions being also referred to in the art as ocular images.

This application is a continuation in part of my copending application, Serial No. 653,058, filed January 23, 1933, which has become Patent No. 2,024,552, dated December 17, 1935.

One of the principal objects of the invention is to provide improved means and method for forming lenses of the above character with fields of the same or different powers and/or magnifications.

Another object of the invention is to provide means of separating in a lens or lens systems of the above character, the size and focal power factors so that the said factors may be made the same or varied with respect to each other in the respective focal fields of the lens whereby the said lens may be made in a blank form, so one surface is left for the impression of the prescriptive focal power required in each respective focal field, the remaining parts giving the true size effect independently of the respective prescriptive surfaces.

Other objects are to provide lenses of this character having increased power for the reading distance and/or having different power and/or magnification for the reading portion from that of the distance portion, and/or having the reading portion of the same power as the distance portion but of different magnification, that is to say, lenses having a distance portion including means for change of size of image over the prescription requirements without change of focus thereof and another portion different from the first portion, and/or having a reading portion of different power than the distance power but of substantially the same magnification.

Another object of the invention is to provide a one piece type bifocal or multifocal lens having the above characteristics.

Another object of the invention is to provide a fused type one element lens, that is, a lens having its major portion formed from a single piece of glass, and having the above characteristics.

Another object of the invention is to provide an ophthalmic correction for the two eyes of a patient whereby the focal power factors of the respective lenses in each of the respective focal fields of said lenses are to the prescriptive requirements of the patient and also provide means for balancing the ocular image or mental impression size differences of the eyes in each of the respective fields of the lenses with substantially no change in the focal power factors of the respective focal fields of said lenses.

Other objects and advantages of the invention will become apparent from the following description taken in connection with the accompanying drawing. It will be apparent that many changes in the arrangement of parts, details of construction and steps of the process may be made without departing from the spirit of the invention as expressed in the accompanying claims. I, therefore, do not wish to be confined to the exact matters shown and described as the preferred forms have been shown by way of illustration only.

Referring to the drawing:

Fig. I is a front view of a lens embodying the invention;

Fig. II is a cross sectional view taken on line II—II of Fig. I, showing one form of the invention;

Fig. III is a cross section showing another form of the invention;

Fig. IV is a cross section showing another form of the invention;

Fig. V is a diagrammatic view in cross section, showing the relation of the lens to the eye;

Fig. VI is a cross section of another form of the invention;

Fig. VII is a sectional view of a one piece type single element bifocal or multifocal lens embodying the invention; and Fig. VIII is a sectional view similar to Fig. VII of a fused type bifocal or multifocal lens embodying the invention.

In the past, eye corrections embraced the corrections for sphere, cylinder and prism, either separately, in various combinations or embodying all of said corrections. Recently, a fourth correction has been added to these, namely, a correction for the difference in size of image of the two eyes or in different meridians of an eye without a change of the focus of the prescription requirements of the eye or eyes. The inclusion of this fourth element has introduced difficulties into the art of lens making not hitherto encountered; either additional lens surfaces are required or a modification of the various spherical, cylindrical or toric curves now in use may be required.

The new problem introduces practically a new art in eye examination and in the art of making lenses. These difficulties are increased where it is attempted to provide the new form of lens with fields for both distance and reading corrections, as it has been found by past experience and by actual test that the eyes of a patient may have a different ratio of size error when looking at a near object than when looking at a distant object and that this size difference may be entirely different from that introduced by the change of power in the near vision portion of the lens. This, therefore, necessitates the provision of lenses having two or more different focal fields for different object distances wherein the power factors and the magnification factors of the different respective focal fields may be altered independently of each other and without the altering of one factor bringing about a change in the other factor in the finished lenses. It is, therefore, one of the principal objects of this invention to provide lenses of the above character with different focal fields and to provide a practicable and economical process for making the same whereby all of the desired characteristics of the lenses may be incorporated in an ophthalmic correction embodying one or more lens elements in the lens system or systems producing the final prescriptive requirements.

Referring to the drawing wherein like characters of reference indicate like parts throughout:

In Fig. V, I have shown an elementary lens of two parts designed to change the size of image of the focal prescription requirements without change of power thereof. The eye is shown at 3. The element 1 is the ordinary prescription lens having the surfaces 15 and 16 designed in the usual prior art way for corrections of sphere, cylinder and prism, one, all or any. The element 2 is the element that provides the change in size of image from the focal prescription requirement with practically no change of power thereof. It has the surfaces 17 and 18 arranged as follows: The relationship of the surfaces 17 and 18 is such as to provide substantially no optical power but a magnification. These surfaces may be flat, spherical, toric or cylindrical. The amount of change in size depends upon the curvatures of the two surfaces and the thickness of the element. Where change in size of the two major meridians is desired, the spherical surfaces are used; when change in one meridian is desired only, the cylindrical surfaces are used. In such a lens element the two surfaces in order to produce no optical power are nearly concentric. When the concave side of the element is placed nearest the eye, the size of the image is increased; when the convex side of the element is nearest the eye, the size of the image is decreased; the former is preferred. The desired change in size is obtained by the optical relationship or shape of the two surfaces of the element and the thickness thereof. The manification in a no power optical element is due to the bending or curving of the element. If a distant object is viewed through a plane parallel, the effect of this plane parallel is negligible.

If, however, we bend this plane parallel as happens when it is ground on different base curves, a magnification will be produced. The element 2 is shown curved or bent to give the desired amount of magnification.

For description of lenses of this nature, see article entitled "Lenses for changing the size and shape of dioptric images" by Ames, Gliddon and Ogle of the Department of Research in Physiological Optics, Dartmouth Medical School, Hanover, New Hampshire, contained in a pamphlet reprint from the Annals of the Distinguished Service Foundation of Optometry, Boston, Massachusetts, 1932, page 27.

The method of constructing a "size" lens, having focal power and in addition thereto, a size magnification independent of the magnification due to power, is old in the art, being set forth in United States Letters Patent No. 1,933,578 to Ames, November 7, 1933.

The method of obtaining the thickness, surfaces, separations and lens characteristics are set forth in this patent with the necessary formula and examples, etc. The lens of the said Ames patent, is the lens of the publication referred to above. The lens produced gives the required axial focal power and the required "size" manification. As explained in the said patent, the characteristics are, the distance from the eye, the distance to the object, the thickness and separations and the curvatures of the surfaces. The "size" element is a function of the form or shape of the lens and the thickness, the power element is the relationship of the surfaces, one to the other, as usual in prior art lenses.

The first step in the invention is to calculate the basic "size" and power lens for a given distance of object as described in said publication and patent. This is usually the major field of the lens of the invention.

For the purpose of providing an additional field a second focal field 4 for the reading distance is placed on the lens, the other portion of the lens being arranged for distance vision.

The arrangement of the two fields will be dependent on the optical requirements for each field. In Figs. II to IV, inclusive, I have shown the surfaces of the distance field elements as flat. It will be understood that these surfaces will be curved in most instances as called for by the various prescriptive requirements as well understood in the art. I have also shown these lens elements as separated. It will be understood that these elements may be separated or abutted one against the other and secured together by cement, or fusing or otherwise, or if modified surfaces are used they may be made in one piece. The reading field 4 may be made with a segment cemented or fused on or may be ground in one piece with the lens element. The shape of the reading field may be as desired, circular or other conformation and the segment may be in one piece or of a plurality of sections as desired. In the instance of the use of a plurality of sections it is to be understood that the said sections may be formed of a different index of refraction or to different surface curvatures to produce varying focal powers and/or size corrections throughout the various sections. The construction and arrangement of this field may be in accordance with any of the reading fields known in the art and may be placed in any desired relation to the distance field as well known in the art. The segment field may be applied to a full sized lens or to a reduced sized lenticular lens as well.

In Figure II the distance field is comprised of the lens elements 5 and 6 held apart by the spacer member 7. This field includes in its optical corrections the means for changing the size of image without change of focus in combination with the required correction for sphere, cylinder and prism, as the case may be, through the relationship of the optical surfaces placed on the elements 5 and 6. This field then has power and manification of a required amount. In the element 6 is placed the recess 8 having an optical surface and on the element 5 and in line with the recess 8, the raised optical surface 9. The surfaces 8 and 9 are related optically to give a required power and magnification different from that of the distance field. As shown the magnification will be increased. The optical surfaces 8 and 9 are of optical conformations and structure well known in the art for producing the required optical properties. The part 9 may be integral with 5 or a separate piece cemented or fused thereon. The resultant lens will produce a distance field of required power and magnification and a reading field of required power and magnification different from the distance field.

If the added lens system represented by 8 and 9 is to have focal power and one size magnification the system is calculated just as the prior art lens. If it is also to have size magnification for a given distance of object it is calculated by the method set forth by the said Ames patent. Both calculations are prior art procedures. As shown the lens systems represented by 8 and 9 have both a different focal power and a different "size" magnification from the major field.

The procedure is to first calculate the major field to required power and "size" magnification to the required distance of object and then to calculate the minor field to required focal power and "size" magnification to required distance of object and then produce the major lens and impose the minor one thereon. Both fields are calculated by prior art methods as stated, and the surfaces are made and the lens constructed by well known prior art methods of grinding and polishing. The surfaces are of types well known in the art.

The invention is new and novel in the calculated relationship of the lens elements to produce size magnifications at different distances and in the result obtained. The process comprises a new series of steps to so relate the parts for the desired results. As set forth in the said Ames patent in the formula therein, one of the elements of a "size" lens is the distance of the object from the eye. The major lens is primarily for distant vision, i. e., for sight of a relatively distant object. The minor lens is primarily for reading distance or distances nearer than the object of the major field, hence the distances being different for the two fields the "size" magnification for the two fields may also be different and their ratios different.

In considering the focal powers of the two fields as well as the "size" magnifications therefor, it is to be understood that as usual in prior art lens considerations, zero power is the transition point from plus to minus powers, and zero magnification is the transition point from plus to minus magnifications. Zero, therefore, is considered a power or magnification as the case may be, to provide the transition between plus and minus powers and magnifications.

The lens of Fig. III will give the same results as the lens of Fig. II and is the same in structure except that the segment 10 is an insert of a glass of different index of refraction from the glass of element 5 operating on an optical principle well understood in the art to produce a different power from the element 5. The insert 10 may be cemented or fused in the recess in the element 5. The curve of the recess is optically arranged and constructed.

In Figs. II and III the reading field may be made with the same power as the power of the distance field and only the magnification be changed, if desired. The said fields may also be made with different powers and with the same magnification, if desired.

In Fig. IV is shown a lens which gives a distance field of required power and magnification and a reading field of required power and magnification but different from that of the distance field. In this lens, the magnification will be decreased. This lens is just the reverse of the lens of Fig. II. The segment 9 is placed on the element 6 and surface 8 on the element 5. In this lens, the reading field may be made the same power as the distance field and only the magnification of the reading field be changed, if desired.

It is apparent that with the four lens surfaces of the elements 5 and 6 and the additional surfaces of the segments 9 and 10 and the recess 8, a great latitude is afforded in making optical combinations for the regular corrections for sphere, cylinder, and prism as well as for change in magnification without change in focus.

It is to be understood that the separate lens elements may be made of glasses of any desired indices of refraction and that the said elements may be secured together by uniting their entire peripheral edges or by uniting the said edges only at a few selected spots. This uniting depends largely upon the shapes and curvatures of the elements.

In Fig. VI is shown a lens comprising two elements 20 and 21, having the surfaces 22, 23, 24 and 25. The surfaces 23 and 24 are comating and the two elements are fitted together on these surfaces, being cemented, fused, or otherwise held together. In the surface 24, of the element 21, is made the recess 26 and in this recess is fitted the segment 27. This segment is of a different index of refraction from 21 and is cemented, fused or otherwise secured in the recess 26. The segment is designed to give the reading power, and the surfaces 22 and 25 may be related to give the desired focal power and include the correction desired for magnification or change of size of image. This arrangement permits the making of desired surfaces on the faces 22 and 25 independent of the segment. These surfaces may be either spherical or non-spherical as required to give the required power and magnification. This arrangement permits the use of toric or aspherical curves on either of these surfaces whereby the lens may be corrected for marginal astigmatism, as well, if desired. The outer surfaces are entirely independent of the surfaces of the segment. Although the segment 27 has been described as being secured in a recess 26 formed in the element 21, it is to be understood that the said segment may be secured in a recess in the element 20 if desired or in recesses formed in each of the contiguous surfaces of said elements if desired. It is also apparent that the segment may be of any desired contour shape and may be formed of one or more pieces of lens medium of the same or different indices of refraction as desired. By forming the segment of a plurality of pieces of lens medium of different indices of refraction, it is quite obvious that fields of different focal powers may be obtained. The construction of the lens, indices of refraction of the various parts of the lens, surface curvatures, etc., of course, will depend upon the desired characteristics of the lens.

While the above lenses have been described as being formed of two separate elements 5 and 6 or 20 and 21, as the case may be, it is to be understood that lenses having the same characteristics as regards power and magnification in the different focal fields thereof may be formed, as shown in Figs. VII and VIII, from a single piece of lens medium having either the reading field formed integrally therewith or by fusing or otherwise securing a separate segment of glass thereto. In substance, the said lenses will be in effect similar to the lenses shown in Figs. II to IV, inclusive, except that the filler piece 7 is in effect removed and the portions 5 and 6 formed integral with each other.

As previously stated, it has been found by actual tests that an eye has a different magnification or image when looking at a near object at substantially reading distance from the eye than when looking at a distant object or object twenty feet or more from the eye, so that when forming a bifocal or multifocal lens this difference of image size for said distances must be considered as well as the focal power for said distances. It has been found that the focal power differences between the said fields may be greater or less than the size image differences and that each factor must, therefore, be considered and dealt with separately in the computation of the lens. So far we have spoken of magnification and size magnification in the general known procedures. For the actual discussion of Figures VII and VIII it is advantageous to use the concepts of my copending application Serial No. 720,594 which has become Patent No. 2,077,134. This concept briefly is that magnification due to the focal power of the lens system can be separated from the magnification due to the shape, thicknesses, etc. of the lens system; the first of these we call power magnification and the latter shape magnification.

In Fig. VII there is shown a one piece type lens having a correction for a distant object 30 at a large distance A from the eye and an object 31 at a distance indicated at B substantially equal to the reading distance, usually four hundred millimeters from the eye. This particular lens is formed from a crown glass having an index of refraction of 1.523, which is in common use in forming present day ophthalmic lenses, and has all of its surface curvatures controlling the power and/or size correction in the different focal fields thereof, formed on a single piece of lens medium.

To illustrate how a lens of this nature may be formed with all the prescriptive requirements as to focus and magnification, let us first assume that the finished lens is to have a power of plus 1.00 diopters and a shape magnification of 2 per cent in the distance portion thereof and a plus 2.00 diopter addition or 3.00 diopter power and a shape magnification of 4 per cent in the reading field.

In the following computations:

$D_1$ is the front surface of the lens.
$D_2$ is the rear surface of the lens.
$D_e$ is power as measured from the ocular surface, assuming parallel light entering the system.
$s$ is the reduced thickness of each element.
$\tau$ is the actual thickness of each element.
$\Sigma\tau$ is the total lens thickness.
$\eta$ or $\mu$ is the glass index, $$s = -t = \frac{\tau}{\mu}$$

$M'$ is the total magnification or size magnification of a distant object.
$S'$ is the distance shape magnification.
$P'$ is the distance power magnification.
$U$ is the distance from the effective stop point to the ocular surface of the lens system.
$d'$ is the distance from the ocular surface to the object.
$M$ is the total magnification of a near object.
$S$ is the near shape magnification.
$P$ is the near power magnification.

$\rho_1$, $\rho_2$, etc. are the surface powers of successive surfaces following the sign conventions of Pendlebury as given in "Charles Pendlebury, M. A. FRAS published Cambridge, England, 1884."

$t_1$, $t_2$, etc. are the successive thicknesses or separations divided by the index of refraction of the medium, either glass or air, and taken in the negative senses as Pendlebury uses these values.

The terms A, B, C and D are the Gauss equations as given by Pendlebury, designating certain function of surfaces, indices, thickness and special relations in a lens system. Specifically A is the reciprocal of the equivalent focal length of the system, B is the partial derivative of A with respect to the first surface power, C is the partial derivative of A with respect to the last surface power and D is the second partial derivative with respect to the first and last surface power.

$l$ is the distance for the entrance window or reference point of the eye to the object and is equal to $U+d'$.

The formulae which will be used in computing the reduced thickness $s$ from the fictitious ocular surface $(D_2)$ and a given value of $S'-1$ or the percentage of $S'$ is given implicitly in my copending application but for clarity the derivation of this form is here given. Using the notation of the copending application, for a single thick lens $$D_c = \frac{\rho_1 + \rho_2 + \rho_1\rho_2 t_1}{1 + \rho_1 t_1}$$

and $$S' = \frac{1}{C} = \frac{1}{1+\rho_1 t}$$

then $$S' - 1 = \frac{-\rho_1 t_1}{1+\rho_1 t_1}$$

Then if we make $\rho_2$ such a value that $D_c$ is zero we have $$\rho_1 + \rho_2 + \rho_1\rho_2 t_1 = 0$$

or $$-\frac{\rho_1 t_1}{1+\rho_1 t_1} = \rho_2 t_1 = (S'-1)$$

Therefore, $S'-1 = \rho_2 t_1 = -s(D_2)$ where $(D_2)$ is the fictitious ocular surface.

The derivation of the equations in the above paragraph are given in applicant's copending application Serial No. 720,594, filed April 14, 1934, which has become Patent No. 2,077,134.

The method of computing the lens is as follows:

I first assume a fictitious zero power lens ocular surface 32 of say minus 6 diopters, which surface will be generally known in the formula as the fictitious rear surface $(D_2)$ of the lens. The minus 6 diopter curve is chosen because, for a weak distance correction, it enables the production of a good form of lens. With the known required values for the distance portion of the lens, the surface curvatures, thickness, etc. of the lens are applied as follows:

$$(S'-1) = 2\% = 0.02 = -s \ (D_2)$$
$$-s \ (-6) = 0.02 \quad s = 0.00333$$

thickness of lens $= s \times$ index $= 0.00508$ m. $= 5.08$ mm.

The front surface 33 to give zero power will therefore be plus 5.88 diopters. To obtain the desired power of plus 1.00 diopter in the distance portion, I add this value to the fictitious minus 6 surface and obtain an actual minus 5 diopter surface. The distance lens form will now be; on the front surface 33 a curvature of about plus 5.88 diopters, a thickness 34 of about 5.08 millimeters, and an ocular surface curvature 35 of about minus 5.00 diopters. Note: Actually this lens would be a little better for oblique aberrations if the computation were gone through again and about a minus 6.50 diopters or minus 6.75 diopters fictitious surface were assumed.

Now let us assume a plus 2 diopter addition for segment field with a 4 per cent S' magnification, that is, S'−1=0.04. This 2 diopter addition gives, for the total reading power, plus 3 diopters. The segment diameter is to be 20 millimeters.

The exact glass thickness 43 depends upon the position and diameter of the segment and for each specific case must be determined by the usual methods of determining lens thicknesses. However, for fairly close approximation, to start with, we can assume certain obvious things.

First of all, the segment has two diopters more power than the distance so it will be thicker than the distance portion where the segment is placed. This increase in thickness is 0.2 millimeter but the segment is below the center of the distance portion where the lens is thinner; now a fair position is for the upper edge to be 5 millimeters below the optical center of the distance portion, or the optical center of the distance portion to be 15 millimeters from the center of the segment causing the center of the segment to be 0.2 millimeter thinner than the center of the distance portion so our new thickness 43 at center of the segment will be 5.1 mm.+0.2 mm.−0.2 mm.=5.1 mm.=0.0051 m.

The next thing to obtain is a fictitious curvature 36 by which the power and magnification of the reading field can be worked out. We require that $(S'-1)=4\%=0.04=-s(D_2)$ and so $$s=\frac{0.0051}{1.523}=0.00333$$

so $$-(D_2)=\frac{0.04}{0.00333}=-12 \text{ diopters}$$

for the fictitious ocular surface 36. Now we desire a total power of plus 3 diopters, therefore the actual ocular surface 37 of the segment is −12+3=−9 diopters and the front curve 38 of the segment is then put on, which if we actually had the fictitious surface −12 diopters on the lens, would give zero power. This surface will be about plus 11.54 diopters. These figures for the correction of power due to thickness and the depth of curve or thickness change for different powers have been taken from practical lens grinder's charts and are simply approximate and are given herein only by way of illustration.

Let us take the same example as the preceding and assume no shape magnification S' for the segment. This is obtained by making the front 38 flat where the segment is and putting all the power on the ocular surface 37, that is, for the segment a plus 3.00 diopter curve instead of the minus 5.00 diopter curve of the distance power.

It will be seen that any values within practical limits as regards power and shape magnification may be obtained by the method shown.

Now if it is desired to make a fused bifocal, as shown in Fig. VIII, the computation is longer because there are three surfaces involved, that is, the front surface 39, the interface 40 of the fused combination and the ocular surface 41, 39 and 41 corresponding to 33 and 35 respectively of Fig. VII.

We will take the same distance correction and actually the same distance lens as that set forth above in Fig. VII but because of the aberrations introduced by a too steep interface 40 we will take a more common value of the magnification, that is 3%, instead of 4% for the reading. While the equations for this may be written out and solved directly, an indirect approach is better.

The total glass thickness 44 will be for a first approximation 0.2 millimeter less than the thickness 34 of the distance portion, that is 4.0 millimeters, because the distance lens is thinner where the button is. Then, if this were a one piece lens we would have a fictitious ocular curve $$-(D_2)=0.03 \text{ (i. e. 3\%)}$$

divided by the reduced thickness which is $$\frac{4.9}{1.523}$$

or $$(D_2)=-9.31 \text{ diopters}$$

The one piece front curve 33 would then be plus 9.02 diopters instead of plus 5.88 or we will have to make a fused button 42 of about 3.25 diopters addition to correspond with the portion 38 in Fig. VII.

Now, assume high index flint usually used for additions of over 2 diopters, that is, 1.700 flint for the fused insert 42. This flint gives a factor of $$\frac{0.523}{0.700-0.523}=2.95$$

so the button must be 3.25×2.95 which is 9.60 diopters. We have the front curve 39, then, plus 5.88 so the interface 40 must be 9.60−5.88= 3.72 diopters, the thickness of the button which for 20 millimeters will be 1 millimeter, so for first approximation we have the front surface 39 plus 5.88, the flint thickness 1 millimeter, the interface 40 plus 3.72 diopters, both in terms of crown, the crown thickness about 4 millimeters and the ocular surface 45 (−9.31+3.00) or −6.31 diopters.

From one of my copending applications Serial No. 720,594, which has become Patent No. 2,077,134, we have $$\frac{1}{S'}=1-s_3(D_1+D_2+D_3)-\tau_2(D_1+D_2)-D_{1s1} \text{ approximately}$$

where $D_1$ or front surface 39 is $$5.88\times\frac{1.700-1}{1.523-1}=+7.88D$$

$D_2$ or interface 40 is $$3.72\times\frac{1.700-1}{1.523-1}=+4.98D$$

$D_3$ or countersink surface is −3.72 D
$s_1$ or reduced thickness of segment=

$$=\frac{0.0010}{1.7}=.00058$$

$\tau_2$ or space between $D_2$ and $D_3$=0.0000
$s_3$ or thickness between $D_3$ and $D_4$=

$$\frac{.004}{1.523}=.00263$$

$-s_1D_1=$ −0.0046
$-s_3(D_1+D_2+D_3)=$ −0.0240
sum= −0.0286
therefore $$\frac{1}{S'}=0.971$$

or S'=1.03 which is 3% shape magnification.

We have shown examples of the computation of the reading portion of a bifocal in terms of the distance shape magnification as being the practical way to compute this lens. If the distance shape magnification is not known in terms of the near shape magnification which may be given on the prescription, it can be determined by the method which follows:

The shape magnification for a distant system $S'$ can be expressed in terms of the near shape magnification $S$ and the known lens constants by a simple formula. In my copending application Serial No. 720,504, which has become Patent No. 2,077,134, I have shown that the total magnification of a system is $$M = \frac{U + \Sigma \tau + d}{U(B - Ad) + Cd - D} = \frac{1}{U(B - Ad) + Cd - D}$$

Then, if we consider the power of the system as in one lens surface at the position of the ocular surface and call this value $D_e = A/C$, all the other surfaces vanishing, then $A = \rho_1$; $C = 1$; $B = 1$; $D = 0$, and $d$, the distance from the front of the system becoming $d'$ which is the new $d$; and since the object is at the same position in space $d' = d + \Sigma \tau$ At the same time, call this specialized value of $M$ as $P$ since it is the magnification due to power alone measured from the ocular surface. Substituting these values in the above equation we have for the power magnification for a near object $$P = \frac{1}{U(1 - d'D_e) + d'} = \frac{1}{1 - U\frac{d'}{l} \cdot D_e} \text{ since } U + d' = l$$

Then for any shape of system, define $S$ so that $S \times P = M$, the total magnification therefore.

$$S = M\left(1 - U\frac{d'}{l} \cdot D_e\right)$$

We can arrive at the same formula for $P$ by putting an infinitely thin lens at the position of the ocular surface without using the general formula but the demonstration is longer.

In my copending application Serial No. 720,594, which has become Patent No. 2,077,134, I previously have defined the distance shape magnification $$S' = \frac{1}{C}$$

and $$P' = \frac{1}{1 - UD_e}$$

which of course, is easily derived from the near value of $P$ since $$\frac{d'}{l} = \frac{d'}{d' + U}$$

and if $d'$ becomes very great the ratio of $$\frac{d'}{l}$$

is unity.

The ratio of the distance to the near shape magnification $$\frac{S'}{S} = \frac{1}{C \cdot M\left(1 - U\frac{d'}{l} \cdot D_e\right)}$$

which after reduction becomes $$\frac{S'}{S} = 1 + \frac{U}{l}\left(\frac{S'^2 - 1}{1 - U\frac{d'}{l} \cdot D_e}\right) - \frac{(\Sigma \tau + DS')(1 - UD_e)}{l\left(1 - U\frac{d'}{l} \cdot D_e\right)}$$

or $$\frac{S'}{S} = 1 + \frac{U}{l}(S'^2 - 1) \cdot P - \frac{\Sigma \tau + DS'}{l} \cdot \frac{P}{P'}$$

The first term involves all known quantities except $S'^2 - 1$ and for this the value of $S^2 - 1$ may be used as a first and generally final approximation. The distance from the effective stop point to the ocular surface is $U$. The distance from the ocular surface to the object is $d'$ and $l = U + d'$ and of course $D_e$ is the power as measured from the ocular surface assuming parallel light entering the system.

An approximate computation of the values of this term follows: The value of $U$ may be about 20 millimeters or 0.020 meter. Value $d'$ is for ordinary reading distance, 400 millimeters = 0.400 meter. This corresponds to the usual 2.50 diopter addition for reading.

We will take a total of plus 3 diopters for $D_e$. Now, let us assume a value of $S$ or $S'$ as $1 + 3\%$ or 1.03. Then, the first term is:

$$\frac{0.020}{0.420}\left(\frac{1.03^2 - 1}{1 - 0.020 \times \left(\frac{400}{420}\right) \times 3}\right) = \frac{1}{21}\left(\frac{0.06}{0.94}\right) = 0.003$$

Therefore, this term adds 0.3% to $S$ to obtain $S'$.

The next term involves the thickness of the glass of the whole system. Let us assume this is 5 millimeters; therefore, $\tau = 0.005$ m. The exact value of $D$ may be obtained from my copending application. A value sufficiently close for this purpose is $$-\frac{\tau}{\mu} = -0.0033.$$

Therefore, we have, for the second term, $$-\frac{\{0.0050 - 0.0033(1.03)\} \times (1 - 0.020 \times 3)}{0.420\left\{1 - 0.020\left(\frac{0.400}{0.420}\right) \times 3\right\}}$$

$= -0.004$ approximately, or about $-0.4\%$, as the second term in the reduction of $$\frac{S'}{S}.$$

Therefore, we have for the value of $$\frac{S'}{S}$$

$$\frac{S'}{S} = 1 + 0.003 - 0.004$$

or, in per cent we have $S'$ differs from $S$ by 0.1% for this example. Therefore, for this example, which is an average one, no reduction is needed for $S$ to $S'$ but when needed the values can be easily computed or tabulated.

In the designing of the lens an average thickness value which corresponds to a reading addition of about two diopters is selected so that if the required addition is from 1.50 to 2.50 diopters, the error introduced due to variation in thickness brought about by the use of these additions will be relatively small and negligible. This arrangement permits the provision of lens blanks by which a certain shape magnification for the major field and another shape magnification for the segment may be obtained for a plurality of lenses with varying power corrections in both the distances and reading portions of the lens, which power corrections will have no effect upon the shape magnification factor of said fields.

The latter matter of computing lenses relating to my copending application Serial No. 720,594, which has become Patent No. 2,077,134, provides a blank having its ocular side designed to receive a compound surface, which surface over the distance portion of the lens is such as to produce the required power through said distance portion and which surface over the reading area of the lens is such as to produce the desired power through the reading portion so that both the near and distance prescriptive powers may be obtained independent of the magnification factors of the fields. This is due to the fact that in both the distance and reading fields the shape magnification values are independent of the power magnification values of the respective focal fields of the lens.

It is to be understood that although I have shown and described, in Figs. VII and VIII, a one piece and fused type bifocal of the character described, the distance or major portion of the lens may be formed in a manner similar to a single vision lens element having continuous surfaces, thereon producing the desired magnification factor and focal power factor for the distance field of the finished lens and that I may thereafter cement or otherwise secure a segment to either the front or rear surface of said element or may secure segments to both the front and rear surfaces of said element to produce a reading or near vision field having the required magnification factor and focal power factor for the near object distance produced by forming the required optical surfaces on said segment or segments. In this instance, the surface curvatures and thickness of the different focal fields will be obtained in a manner similar to the lenses of Figs. VII and VIII.

From the foregoing description it will be seen that I have provided simple, efficient and economical means whereby a lens comprising two or more focal fields may be provided with any desired focal power and magnification correction whereby said focal power and magnification factors may be considered and controlled more or less separately and independently of each other.

Having described my invention, I claim:

1. A lens having surfaces of different curvatures providing different fields for equalizing the size difference of images of the two eyes for different given object distances, each having prescriptive shape magnification and prescriptive focal power for said given object distances and a given position before the eye, comprising lens medium of given index of refraction forming the major field of the lens, and a minor piece of lens medium of a different index of refraction secured to said major field and contributing to the formation of the minor field of the lens, said major field having a front optical surface and a thickness which combined together for a lens medium of said index of refraction and given position before the eye will produce the prescriptive shape magnification desired of said field, said minor field comprising pieces of lens medium of different indices of refraction secured together along contiguous optical surfaces, the said minor field having a front optical surface thereon which when combined with the curvatures of said contiguous surfaces, thickness of said field, and the respective indices of refraction of said mediums will produce the shape magnification desired of said minor field and each of said fields having a rear or ocular surface of such power that when combined with the other surfaces of said fields, thicknesses of lens mediums and indices of refraction of said lens mediums will produce the prescriptive focal powers desired of said fields with substantially no change of the shape magnification factors of said fields.

2. A blank for a lens having surfaces of different curvatures providing different fields for equalizing size difference of images of the two eyes for different given object distances, each having prescriptive shape magnification and prescriptive focal powers for said given object distances and a given position before the eye, comprising lens medium of given index of refraction forming the major field of the lens and a minor piece of lens medium of a different index of refraction secured to said major field and contributing to the formation of the minor field of the lens, said major field having a front optical surface and a thickness which combined together for a lens medium of said index of refraction and given position before the eye will produce the prescriptive shape magnification desired of said field, said minor field comprising pieces of lens medium of different indices of refraction secured together along contiguous optical surfaces, the said minor field having a front optical surface thereon which when combined with said curvatures of the contiguous surfaces, thicknesses of said field, and the respective indices of refraction of said mediums will produce the shape magnification desired of said minor field and an excess of material in the direction of the thickness on the ocular side to provide for the placing on said ocular side of optical surfaces over each of said fields of such powers that when combined with the other surfaces of said fields, thicknesses of lens mediums and indices of refraction of said lens mediums will produce the prescriptive focal powers desired of said fields with substantially no change of the shape magnification factors of said fields.

3. A spectacle lens system for use in combination with another spectacle system for the other eye, for equalizing the size difference of images of the two eyes for different given object distances, having surfaces of different curvatures providing two fields, one adjacent the other, each field having prescriptive shape magnification and a prescriptive focal power for each of the said given object distances and a given position before the eye, comprising lens medium of given index of refraction forming a major field of the lens and a minor piece of lens medium of a different index of refraction secured to said major piece and contributing to the formation of the minor field of the lens, said major field having a front optical surface and a thickness which combined together for a lens medium of said index of refraction and given position before the eye will produce the prescriptive shape magnification desired of said field, said minor field comprising pieces of lens medium of different indices of refraction secured together along the contiguous optical surfaces, the said minor field having a front optical surface thereon which when combined with the curvatures of said contiguous surfaces, thickness of said field and the respective indices of refraction of said mediums will produce the shape magnification desired of said minor field and each of said fields having a rear or ocular surface of such power that when combined with the other surfaces of said fields, thicknesses of lens mediums and indices of refraction of said mediums will produce the prescriptive focal powers desired of said fields with substantially no change of the shape magnification factors of said fields.

EDGAR D. TILLYER.